(12) United States Patent
Sullivan

(10) Patent No.: US 7,654,217 B2
(45) Date of Patent: Feb. 2, 2010

(54) BIRD OR ANIMAL REPELLENT SYSTEM

(75) Inventor: Brian E. Sullivan, Otis Orchards, WA (US)

(73) Assignee: Sullivan Mews LLC, Otis Orchards, WA (US)

(*) Notice: Subject to any disclaimer, the term of this patent is extended or adjusted under 35 U.S.C. 154(b) by 0 days.

(21) Appl. No.: 12/009,099

(22) Filed: Jan. 16, 2008

(65) Prior Publication Data
US 2008/0178791 A1 Jul. 31, 2008

Related U.S. Application Data

(60) Provisional application No. 60/880,346, filed on Jan. 16, 2007.

(51) Int. Cl.
*A01M 29/00* (2006.01)
(52) U.S. Cl. .......................... 116/22 A; 43/2
(58) Field of Classification Search ............... 116/22 A, 116/22 R; 43/1–3; 119/712, 713; 446/30, 446/31, 228, 229, 247; 273/366, 367; 340/573.2
See application file for complete search history.

(56) References Cited

U.S. PATENT DOCUMENTS

| | | | |
|---|---|---|---|
| 2,357,900 A * | 9/1944 | Lenhardt | 446/228 |
| 2,731,937 A | 1/1956 | Rhodes | |
| 2,788,762 A | 4/1957 | Wright | |
| 3,405,478 A * | 10/1968 | Richter | 446/229 |
| 4,109,605 A | 8/1978 | Bachli et al. | |
| 4,910,500 A | 3/1990 | Carr | |
| 5,956,880 A | 9/1999 | Sugimoto et al. | |
| 5,977,866 A | 11/1999 | Joseph, Jr. et al. | |
| 6,285,630 B1 | 9/2001 | Jan | |
| 6,357,159 B1 * | 3/2002 | Bowling | 43/2 |
| 6,742,470 B2 | 6/2004 | Keithly | |
| 6,742,471 B2 | 6/2004 | Laidler et al. | |
| 6,907,688 B2 * | 6/2005 | Brint | 43/2 |
| 2004/0035351 A1 | 2/2004 | Keithly | |
| 2004/0255837 A1 | 12/2004 | Donoho | |
| 2005/0241564 A1 | 11/2005 | Guadagna et al. | |
| 2007/0163516 A1 * | 7/2007 | D'Andrea | 119/713 |
| 2007/0221115 A1 * | 9/2007 | Pollard et al. | 116/22 A |
| 2008/0047191 A1 * | 2/2008 | Hally | 43/1 |

FOREIGN PATENT DOCUMENTS

DE 1281741 10/1968

* cited by examiner

*Primary Examiner*—Amy Cohen Johnson
(74) *Attorney, Agent, or Firm*—Lerner, David, Littenberg, Krumholz & Mentlik, LLP

(57) ABSTRACT

A system and method for conveying a bird or animal repelling object along a path, comprising a line for conveying at least one bird or animal repelling object, the line configured to define a predetermined path. The bird or animal repelling object is coupled to the line, and at least two spaced apart supporting braces operatively engage the line and provide support thereto, wherein the line is suspended in the air. The system further includes a drive unit connected to the line and adapted to control the motion of the line with respect to the supporting towers. At least one cover is attached to at least one of the towers in alignment with the path of the line and is configured to shield the object from view when the object is disposed therein.

18 Claims, 8 Drawing Sheets

BIRD OR ANIMAL REPELLENT SYSTEM

CROSS REFERENCE TO RELATED APPLICATIONS

This application claims the benefit of the filing date of U.S. Provisional Patent Application No. 60/880,346, filed Jan. 16, 2007, the disclosure of which is hereby incorporated herein by reference.

FIELD OF THE INVENTION

The invention relates to an animal repellent system. More particularly, the invention relates to a conveying system to move an animal repelling object around a predetermined area.

BACKGROUND OF THE INVENTION

The growing of crops, including, for example, berries, in a field or other area is an activity of significant magnitude. Birds and other animals can damage crops by eating the crops and otherwise damaging the land on which the crops grow. Various types of devices and installations have been used in the past in attempts to scare birds away from crops.

It has been proposed, for example, to scare birds from a field through the use of stationary devices, such as scarecrows. The effectiveness of these devices, however, decreases after a short period of time because the birds or other animals become accustomed to the presence of the devices and lose their fear thereof.

It has also been proposed to scare birds from a field through the use of a loud noise. Such a loud noise may be produced by acoustic systems, such as recordings of distress and warning calls of the species sought to be repelled, or an air gun that ignites combustible gas at predetermined intervals. After a period of use of loud noises, however, birds become accustomed to the noise and the scaring effect is diminished.

It has also been proposed to protect crops and fields against birds through the use of nets or other protective webbing. Use of this method, however, is limited due to the prohibitive cost of building and maintaining such a system, especially over large plots of land.

Because of the problems associated with the use of stationary devices, loud noises, and netting systems to deter birds and other animals from crop fields, farmers have attempted to employ the use of repelling systems for protection. Such systems have included devices that carry scarecrows or other deterrent objects, and can move them in a predetermined motion. The disadvantage of these types of systems, however, is the same as that of stationary devices and loud noises. That is, after a time the birds or animals to be repelled become accustomed to the presence of the scaring device and the scaring effect is diminished.

Therefore, it is desirable to provide a system to repel birds and other animals that overcomes the disadvantages of the prior art.

SUMMARY OF THE INVENTION

One aspect of the present invention provides the ability to preserve the scaring effect on birds and other animals to protect crops and the like by suspending a bird or animal repelling object from a line or cable. The system preferably comprises a cable, having a bird or animal repelling object attached thereto and supported by a support tower, a drive unit to control the movement of the cable, and a cover. The cover provides a place wherein the bird or animal repelling object can be hidden from view. Accordingly, the presence of the bird or animal repelling object is not continuously observable by the birds and animals to be repelled. By emerging from within the cover on a predetermined schedule, preferably timed to mimic the behavior of a bird of prey or other scaring device, the bird or animal repelling object maintains its scaring effect and other animals and birds do not become accustomed to it.

Another aspect of the present invention provides the ability to preserve the scaring effect on birds and other animals to protect crops and the like by providing a cover with a bird or animal repelling object disposed therein. The object emerges from within the cover, and into the view of birds or other animals to be repelled, according to a predetermined or random schedule. The object then returns to the cover and is again hidden from view. Although these particular aspects of the invention are herein disclosed with respect to the protection of crops and fields, it is to be understood that the present invention provides the ability to preserve the scaring effect on birds and other animals in other circumstances as well, such as, for example, to protect fish in lakes or rivers. These and other aspects of the invention are exemplified by a series of preferred embodiments.

One embodiment of the present invention relates to a system for conveying a bird or animal repelling object along a path. The system may include a line for conveying at least one bird or animal repelling object, the line configured to define a predetermined path, and the bird or animal repelling object coupled to the line. There may be at least two spaced apart supporting braces operatively engaged with the line and providing support thereto, wherein the line is suspended in the air. There may also be a drive unit connected to the line and adapted for controlling the motion of the line with respect to the supporting braces along the path. Preferably, the system may further include at least one cover attached to at least one of the braces in alignment with the path and configured to shield the bird or animal repelling object from view when the bird or animal repelling object is disposed therein.

In a preferred embodiment, the bird or animal repelling object is further coupled to the line by a wire suspended from the line. Preferably, the bird or animal repelling object to be conveyed by the line is an animated bird-like object having wings that flap. Further preferably, the system includes a timing device for activating and deactivating the drive unit at set intervals, thereby allowing the bird-like object to remain hidden by the cover or to be conveyed along the path according to a predetermined or random schedule. The timing device may be a light sensor or a motion sensor. The drive unit may move the line at variable speeds and the direction of the movement of the line may be reversible.

An alternative embodiment of the present invention relates to a system for repelling birds or animals from an area. The system may preferably comprise at least two braces positioned at a distance from each other about an area to be protected and a cable supported by the braces. Preferably, a bird or animal repelling object is slideably engaged with the cable and configured to move with respect thereto. Further preferably, at least one shelter supported by at least one of the braces, is positioned in the path of the bird or animal repelling object such that the bird or animal repelling object is hidden from view when disposed therein.

In one preferred embodiment, the system further comprises a propulsion device for propelling animal repelling object along the path. Preferably, the propulsion device may be powered by an electric current. The cable may then carry an electric current and transmit the current to the propulsion device, thereby providing power thereto.

A further embodiment of the present invention relates to a method of repelling birds and other animals. The method comprises attaching a bird or animal repelling object to a conveyor line and conveying the bird or animal repelling object around a predetermined area. Preferably, the method may further include providing a cover in operative relationship with said conveyor line, wherein the bird or animal repelling object can be hidden at predetermined or random intervals when conveyed into said cover.

In an alternative embodiment, the method may include providing a timing device configured to control the timing of the conveying and hiding of the bird or animal repelling object. Preferably, the method may also include reversing the direction of conveyance of the bird or animal repelling object at various intervals or varying the speed of conveyance of the bird or animal repelling object. Further preferably, the method may include providing a propulsion device, attached to the bird or animal repelling object to propel the bird or animal repelling object along the path of the conveyor line. Furthermore, the method may include repeatedly disposing the bird or animal repelling object within the cover so as to hide the object from the view of the bird or animal to be repelled, repeatedly repelling the object out of the cover and into open view of the birds or animals to be repelled, and returning the object to the cover according to a predetermined or random schedule. This schedule may be set or it may be variable. In preferred embodiments, the repelling motion of the bird or animal repelling object out of the cover may be effected by a telescoping rod, scissor-lift cable, line, rope, or track.

BRIEF DESCRIPTION OF THE DRAWINGS

The present invention will be better understood on reading the following detailed description of nonlimiting embodiments thereof, and on examining the accompanying drawings, in which.

DETAILED DESCRIPTION

Figure 1:
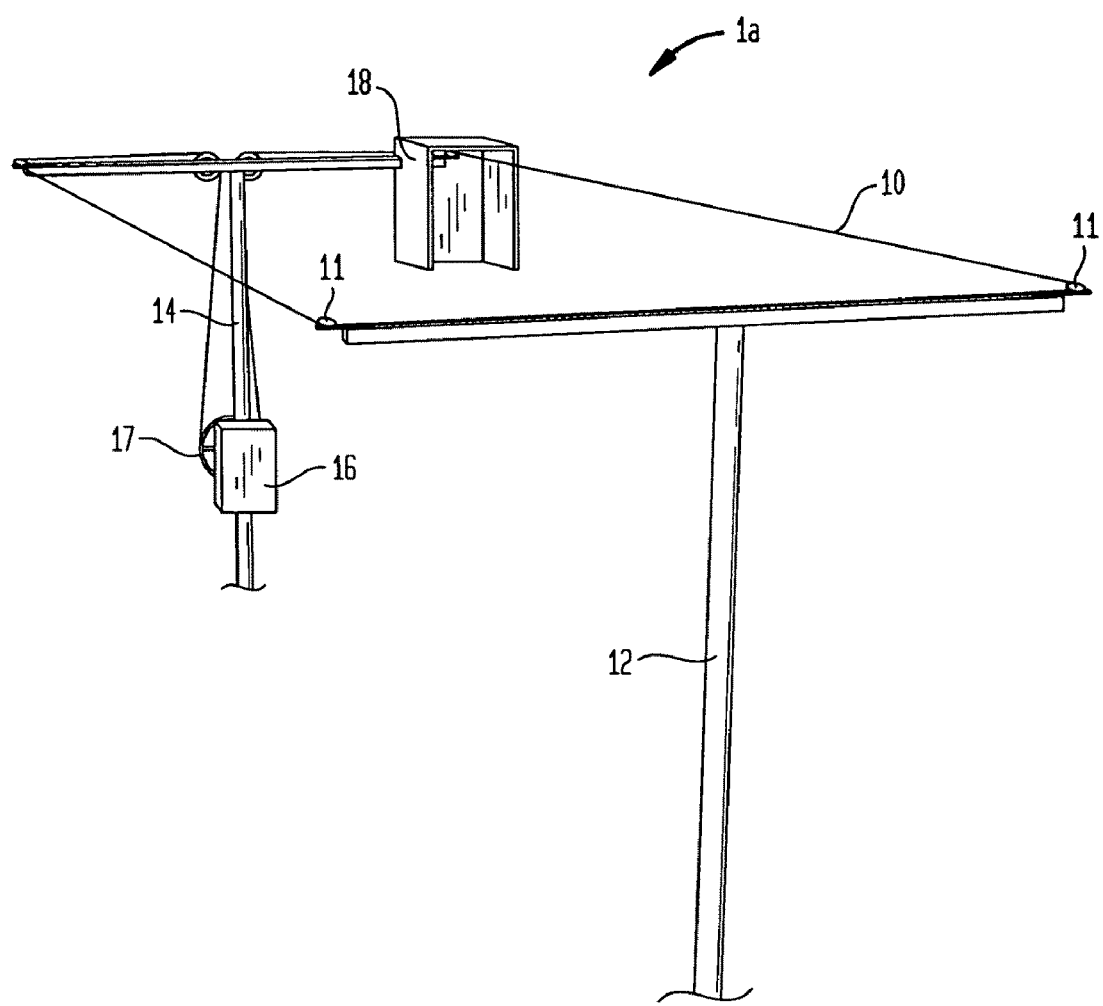
FIG. 1 is a perspective view of a bird repellent system according to an embodiment of the present invention.

The foregoing aspects, features and advantages of the present invention will be further appreciated when considered with reference to the following description of preferred embodiments and accompanying drawings, wherein like reference numerals represent like elements. In describing preferred embodiments of the invention illustrated in the appended drawings, specific terminology will be used for the sake of clarity. However, the invention is not intended to be limited to the specific terms used, and it is to be understood that each specific term includes equivalents that operate in a similar manner to accomplish a similar purpose.

Referring now to the drawings, there is shown in FIG. 1 a perspective view of a bird or animal repellent system 1a according to an embodiment of the present invention. The bird or animal repellent system 1a is capable of conveying at least one bird or animal repelling object, such as a bird-like object (shown in FIG. 5), along a predetermined path. The bird or animal repelling object to be conveyed is attached to a line 10 that defines the path along which the bird or animal repelling object will travel. Line 10 is strong enough to support the bird or animal repelling object and flexible enough to negotiate the curves and bends necessary to ultimately form an endless loop. In one embodiment line 10 is tensioned to about 40 pounds. Line 10 may be constructed of any suitable material including, but not limited to, metal cable, rope, twine, or chain. Preferably the material is ⅛ inch galvanized cable.

As further shown in FIG. 1, line 10 may be supported by at least two supporting braces 12, 14. Preferably, they are spaced apart at least 200 feet, but not more than 225 feet. Further preferably, supporting braces 12, 14 have guiding pulleys 11 mounted thereon. Guiding pulleys 11 allow line 10 to move with respect to supporting braces 12, 14. Supporting braces 12, 14 support line 10 so as to maintain the position of line 10 elevated above the ground. In addition, supporting braces 12, 14 may be positioned as desired in order to direct line 10 around a path that will suit the particular geography of the field in which they are installed. Although two braces, 12 and 14, are shown in FIG. 1, it is to be understood that any number of braces may be used as necessary to ensure that the system covers the desired geographic area. Accordingly, the system may be used to scare away birds and other animals from property of varying size and shape.

Line 10 is powered by a drive unit 16 connected to at least one of the supporting towers 12, 14. Drive unit 16 may be a motor that drives a shaft in a rotational direction, such as, for example, a 0.5 horsepower 90 volt DC motor. There may preferably be a driving pulley 17 attached to the shaft, around which line 10 passes. Line 10 creates a continuous loop that passes around driving pulley 17 connected to drive unit 16 and around each of supporting braces 12, 14. As line 10 passes over driving pulley 17, the rotational motion of driving pulley 17 drives line 10 linearly. Accordingly, line 10 moves in a linear direction along the path defined by the position of support braces 12, 14. If line 10 is driven at too high a rate of speed, then stress may be added to other components of the system, such as, for example, guiding pulleys 11 and drive unit 16. Conversely, if line 10 is driven at too low a rate of speed, then the movement of the bird or animal repelling object may lose some scaring effect on birds or animals to be repelled. Preferably, driving pulley 17 drives line 10 at the rate of about 400 feet per minute. Further preferably, driving pulley 17 may also be self-tensioning to assure that line 10 is maintained at the proper tension.

Drive unit 16 may control the speed at which line 10 moves as well as its direction of movement, thereby allowing variety in the movement of the attached bird or animal repelling object and increasing the scaring effect thereof. Further preferably, the movement of line 10 may be controlled by a variable cycle timer, a light sensor, or a motion sensor.

Also shown in FIG. 1 is cover 18. Cover 18 may consist of an aluminum tubular frame covered with a fabric. The fabric is preferably porous enough to allow air to pass through cover 18, while still shielding the bird or animal repelling object from outside view. Porous or mesh fabric helps to reduce stress on support braces 12, 14 from wind forces when cover 18 is mounted thereon in an elevated position. Alternatively, in situations where stresses created by the environment are of less concern, such as, for example, where cover 18 is mounted to a rooftop, cover 18 may be constructed of any suitable solid material. Cover 18 may be positioned along the path of line 10 and is large enough to hide the bird or animal repelling object being conveyed by line 10 from outside view.

It is to be understood that there may be more than one cover 18 located along the path of line 10. The hiding of the bird or animal repelling object by cover 18 allows the bird or animal repelling object to appear and disappear from the view of birds and animals to be repelled according to a schedule dictated by a user of system 1a, such as during predetermined, random, or pseudo-random times. In this way, where the bird or animal repelling object is made to look like a real bird, the appearance thereof mimics more closely the activity of a real bird, thus increasing the scaring effect of the bird or animal repelling object. The bird or animal repelling object may be made to appear like a real bird by exhibiting animated features, such as flapping wings. Furthermore, because the bird or animal repelling object is not continuously present, the birds to be repelled do not become accustomed to it and the scaring effect is maintained.

Figure 2:
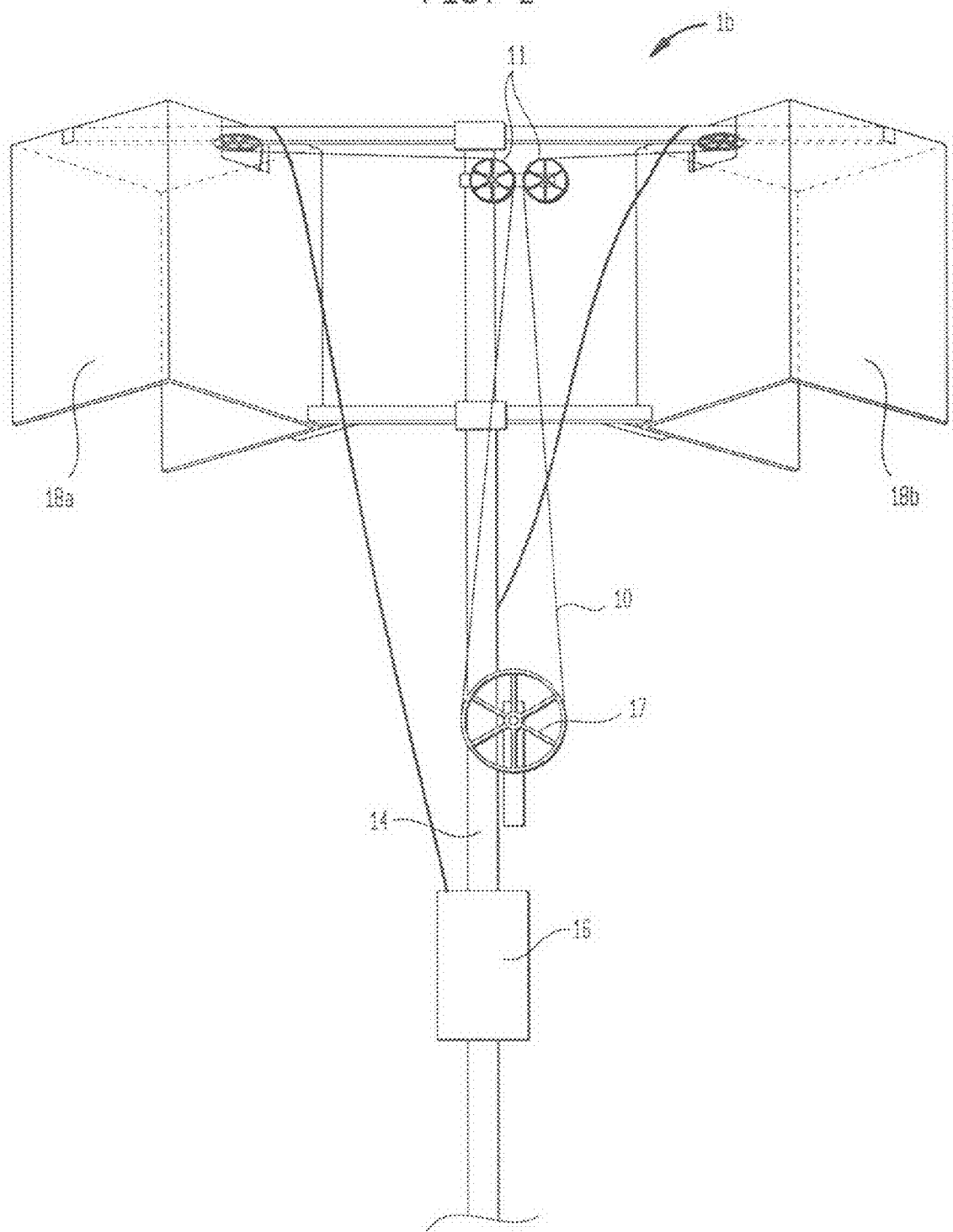
FIG. 2 is a plan view of a bird repellent system according to a further embodiment of the present invention.
Figure 3:
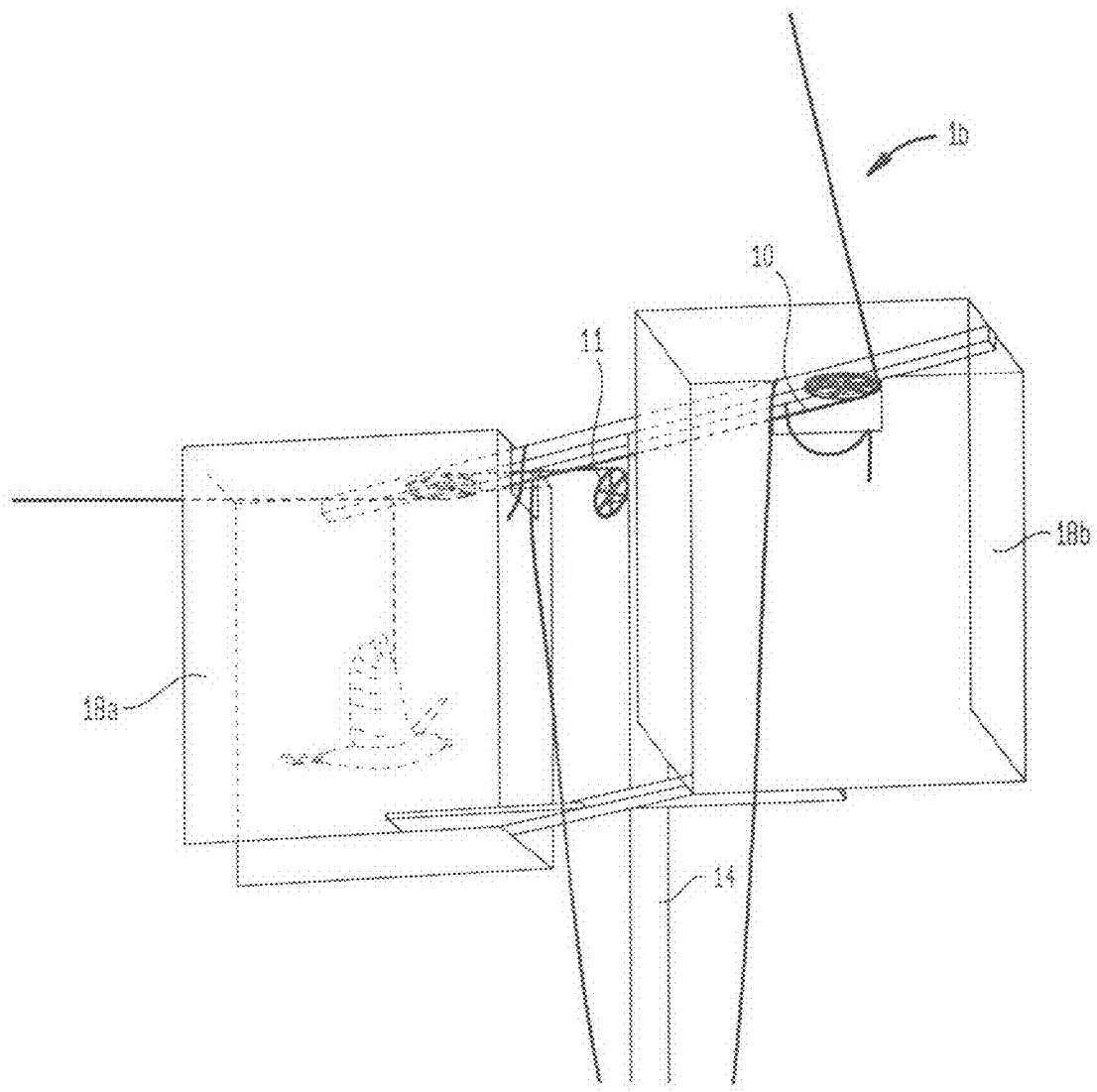
FIG. 3 is a perspective view of the cover of FIG. 2.

FIGS. 2-3 show a plan view and a perspective view of a bird or animal repellent system 1b according to a further embodiment of the present invention. Support brace 14 maintains line 10 in an elevated position. Line 10 is driven by a drive unit 16 as described above with reference to system 1a. In one preferred embodiment, two covers 18a, 18b are provided, each large enough to hide the object being conveyed by line 10 from outside view. The provision of two covers 18a, 18b creates more than one place for the bird or animal repelling object to be hidden from view. Because each field or other piece of property is different, system 1b must be individually adapted to the particular geography and environment where it is installed. To this end, preferably, any number of covers 18a, 18b may be positioned along the path of line 10 to suit the particular system to be installed.

Figure 4:
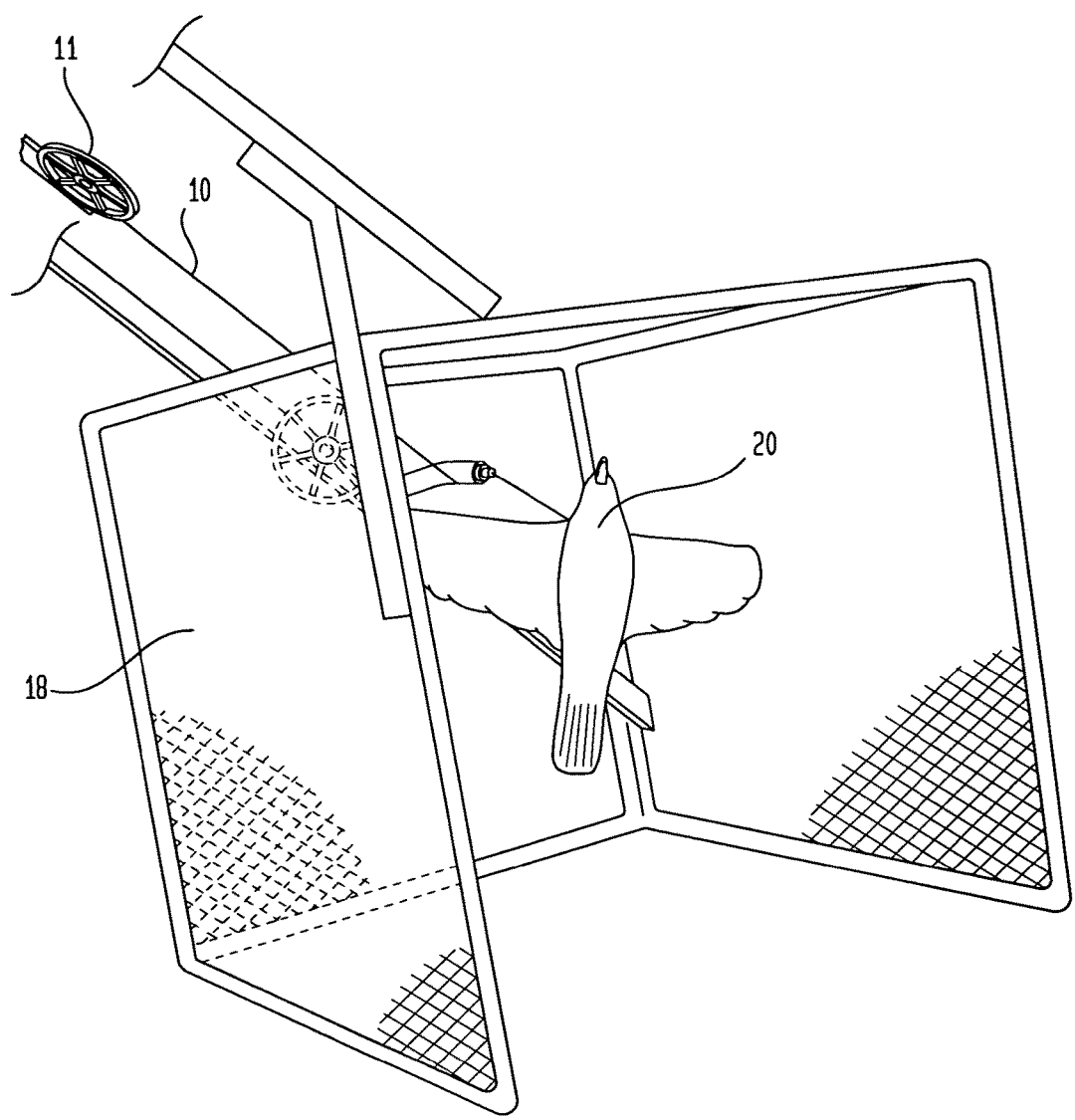
FIG. 4 is a perspective view of the cover of an embodiment of the present invention having a bird or animal repelling object disposed therein.

Referring to FIG. 4, there is shown a perspective view of cover 18 of an embodiment of the present invention having a bird or animal repelling object 20 disposed therein. In one preferred embodiment, bird or animal repelling object 20 is made to have the appearance of a real bird of prey or other natural enemy of the birds and animals to be repelled. Preferably, cover 18 is large enough to hide bird or animal repelling object 20 from view when bird or animal repelling object 20 is disposed therein. Further preferably, because the bird or animal repellent system may be used outdoors, cover 18 is composed of a material with properties designed to protect bird repelling object 20 from the elements of the environment, thereby prolonging the life of bird or animal repelling object 20. Bird or animal repelling object 20 may further be detachable from line 10 to allow for replacement of bird or animal repelling object 20 as needed or desired.

Figure 5:
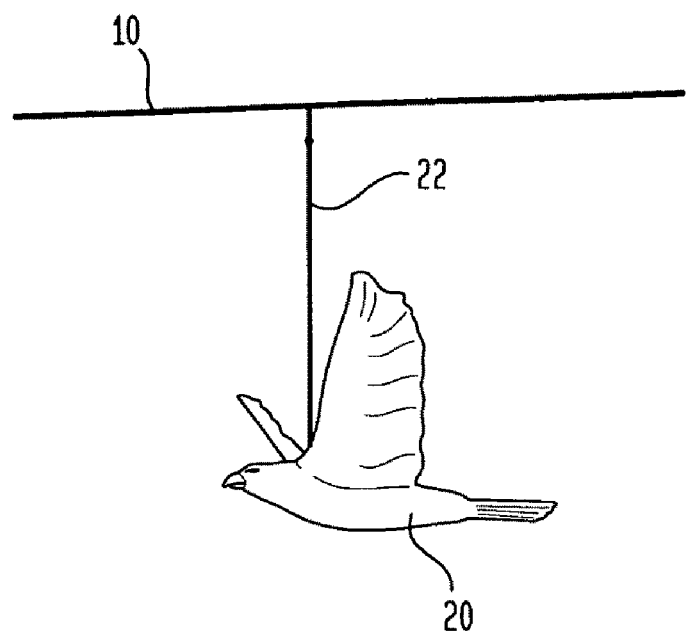
FIG. 5 is a perspective view of the bird or animal repelling object of an embodiment of the present invention.

FIG. 5 further shows bird or animal repelling object 20, attached to line 10, when not disposed within cover 18 (shown in FIG. 4). Bird or animal repelling object 20 is attached to line 10 and moves in conformity therewith along the path of line 10. Preferably, the method of attachment of bird or animal repelling object 20 to line 10 is by means of a cable or wire 22 as shown in FIG. 5, thereby allowing the object to move when acted upon by the wind or other external forces in order to appear more lifelike. Any suitable means of attachment, however, may be used.

Preferably, bird or animal repelling object 20 is a battery-powered robotic bird device with the likeness of a hawk or other bird of prey. The robotic bird device may have a fiberglass body, wing modulation, and exhibit audible attack sounds. The wing modulation may be variable to provide realistic operation of the robotic bird device. Further preferably, the movement of the robotic bird device along the path of line 10 may be designed to imitate flight or attack. In one preferred embodiment, there may be an orientation device attached to the bird or animal repelling object that turns the object to ensure that the object is always facing in the direction of travel. Preferably, the orientation device may be a fin configured to orient the object based on the aerodynamic forces that act thereon while the object is in movement.

A preferred manner of operation will now be described. A user will begin by attaching bird or animal repelling object 20 to conveyor line 10 by means of cable or wire 22. Thereafter, bird or animal repelling object 20 may be conveyed by line 10 along the path of line 10 as defined by supporting braces 12, 14. Bird or animal repelling object 20 will be conveyed within cover 18 when line 10 passes through cover 18. Thereafter the direction of motion of line 10 may be reversed, allowing bird or animal repelling object 20 to emerge from within cover 18. This reversal of direction may preferably be initiated by a switch, positioned to contact bird or animal repelling object 20, inside cover 18. A timer will coordinate the movement of line 10, and consequently of bird or animal repelling object 20, to provide periods of time when bird or animal repelling object 20 is hidden within cover 18 and periods of time when bird or animal repelling object 20 emerges from cover 18 into open view. Preferably, the speed and direction of motion of line 10 vary as dictated by drive unit 16.

Figure 6:
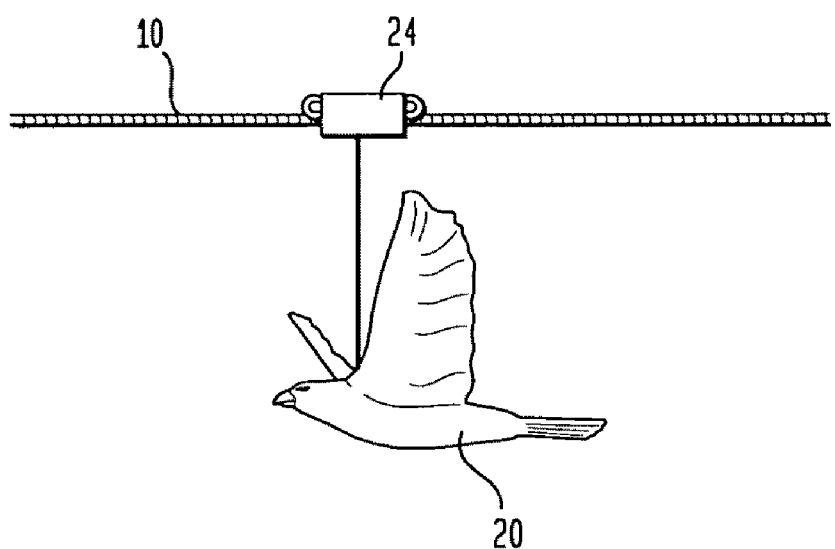
FIG. 6 is a plan view of the bird or animal repelling object of an alternative embodiment of the present invention.

Referring to FIG. 6, there is shown bird or animal repelling device 20 slideably engaged with line 10 and configured to move relative thereto. Bird and animal repelling device 20 may be propelled in a direction parallel to the path of line 10 by propulsion device 24. Propulsion device 24 may include a self-contained power unit, or be powered by batteries or other internal energy source. Alternatively, propulsion device 24 may be powered by electricity. In one embodiment, line 10 may carry an electric current, thereby transmitting electricity to propulsion device 24 and consequently propelling bird or animal repelling object 20 along line 10. The propulsion device could include a motor that drives small wheels frictionally engaging line 10, or other types of conveying devices for movement along a line.

Figure 7:
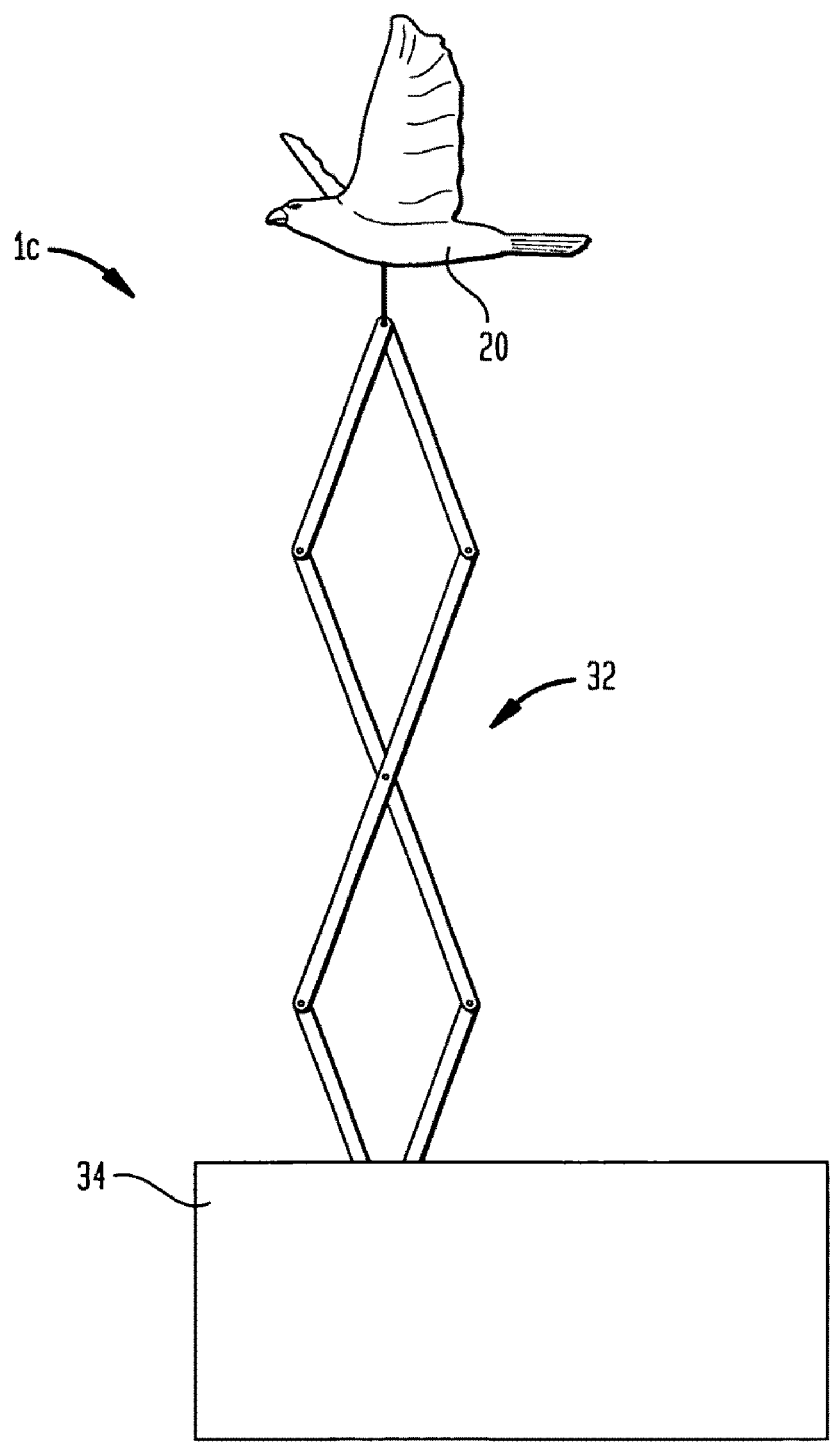
FIG. 7 is a plan view of an alternative embodiment of the present invention.
Figure 8:
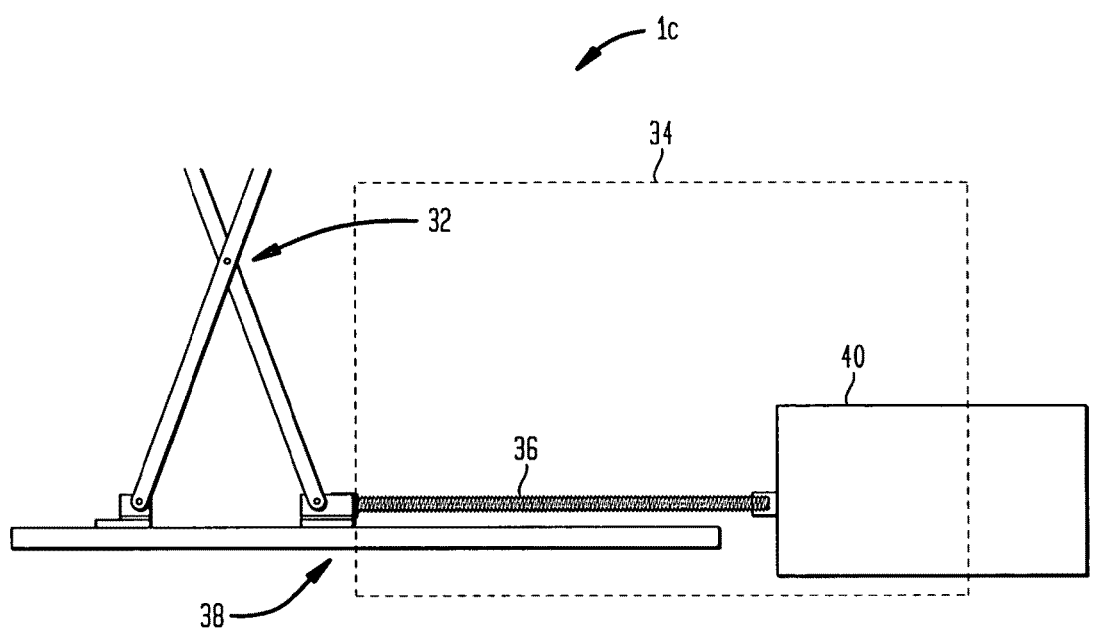
FIG. 8 is a plan view of an aspect of the embodiment of FIG. 7.

FIGS. 7-8 show a plan view of bird or animal repellent system 1c and an aspect of the bird or animal repellent system according to a further alternative embodiment of the present invention. A bird or animal repelling object 20 is attached to a motion compelling device 32. Motion compelling device 32 may be a lifting rod, scissor lift, telescoping rods, cable, rope, line, track, or any other suitable device to move the bird or animal repelling object in and out of cover 34. A motor may also be included to drive the motion compelling device 32. Motion compelling device 32 maintains operative engagement between bird or animal repelling object 20 and cover 34. In a preferred manner of operation, bird or animal repelling object 20 is hidden from outside view within cover 14 while motion compelling implement 32 is in a retracted position. Then, bird or animal repelling object 20 is moved from the retracted position to an extended position outside of cover 34 and into open view of the birds or animals to be repelled.

Motion compelling device 32 may move bird or animal repelling object 20 out of cover 34 in a vertical direction, as shown in FIG. 7. Alternatively, as shown in FIG. 8, horizontal motion compelling device 38 may move bird or animal repelling object 20 (not shown) out of cover 34 (shown in dotted lines) in a horizontal direction. In the alternative embodiment of FIG. 8, horizontal motion compelling device 38 includes a threaded shaft 36 that operatively connects motion compelling device 32, here shown as a scissor lifting mechanism, to a motor 40. The scissor lifting mechanism is attached at its other end to bird or animal repelling object 20 (not shown). Motor 40 may preferably be a DC motor, capable of moving bird or animal repelling device 20 in a horizontal direction at a rate of 11 inches in 10 seconds or less. Threaded shaft 36 may be rigidly attached to motor 40 at one end and correspond to female threading in the base of the scissor lifting mechanism at the other end. As motor 40 turns threaded shaft 36, the scissor lifting mechanism is driven toward or away from cover 34 in which motor 40 is disposed, depending on the direction of rotation of threaded shaft 36. Because bird or animal repelling object 20 is attached to the scissor lifting mechanism, bird or animal repelling object 20 will also be moved vertically with respect to cover 34. Although the foregoing embodiments show movement of bird or animal repelling device in a horizontal and vertical direction, these embodiments are illustrative and movement of bird or animal repelling device 20 in other directions such as at angles, is contemplated.

Figure 9A:
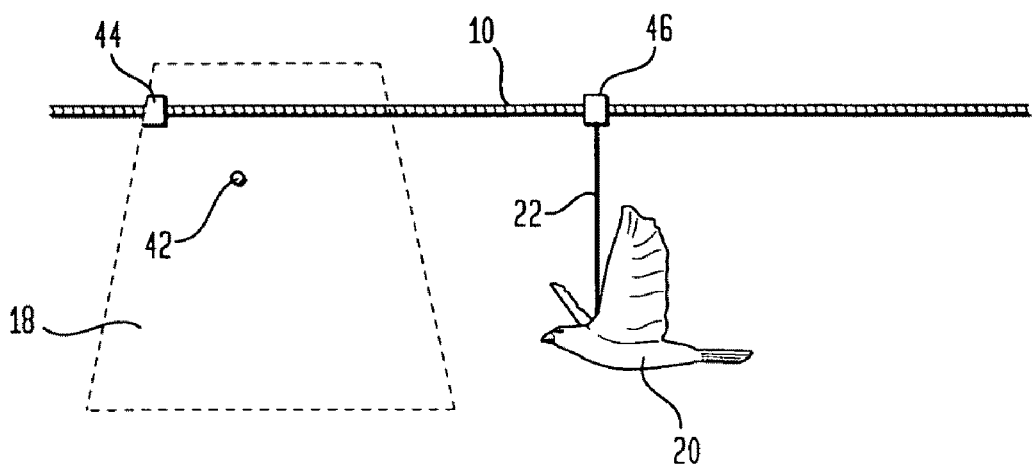
FIG. 9A is a side view of the bird or animal repelling object approaching the cover in accordance with a preferred embodiment.
Figure 9B:
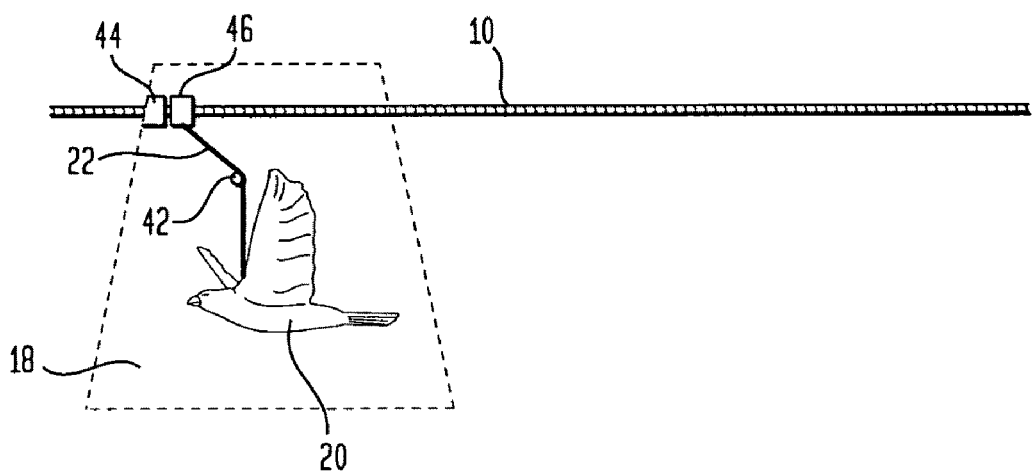
FIG. 9B is a side view of the bird or animal within the cover of FIG. 9A.

Referring to FIGS. 9A and 9B, cover 18 may preferably include an advance bar 42 and a limit switch 44 to assist in the hiding of the bird or animal repelling object 20 (see FIG. 9A and 9B). Preferably, when the bird or animal repelling object 20 enters cover 18, the connection unit 46 connecting the object 20 to wire 22 contacts the limit switch 44 that stops movement of the system while the bird or animal repelling object 20 is disposed within cover 18. Further preferably, an advance bar 42 may be used within the cover 18 to engage wire 22, as shown in FIG. 9B, pulling the object 20 upward and into cover 18. Cover 18 may also be shaped with the opening, through which the bird or animal repelling object enters, having a greater cross sectional area at the lower portion than the top portion of the cover. Preferably, cover 18 may have an opening 6 feet in width at the bottom and tapering to 4 feet in width at the top portion. The height of cover 18 from bottom to top may preferably be 5 feet. Such a configuration may enable the object to more easily enter cover 18 when wind or other external forces are acting on the object as it moves along the path of line 10.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A system for conveying a bird or animal repelling object along a path, comprising:
    a line conveying at least one bird or animal repelling object, said line configured to define a predetermined path, said bird or animal repelling object coupled to said line;
    at least two spaced apart supporting braces operatively engaged with said line and providing support thereto, wherein said line is suspended in the air;
    a drive unit connected to said line adapted for controlling the motion of said line with respect to said at least two supporting braces along said path; and
    at least one cover attached to at least one of said braces in alignment with said path and configured to shield the bird or animal repelling object from view when the bird or animal repelling object is disposed therein.

2. The system of claim 1, wherein said bird or animal repelling object is further coupled to the line by a wire suspended from said line.

3. The system of claim 1, wherein the at least one bird or animal repelling object comprises an animated bird-like object having wings that flap.

4. The system of claim 3, further including a timing device for activating and deactivating said drive unit at set intervals, thereby allowing the bird-like object to remain hidden by the cover or to be conveyed along the path according to a predetermined or random schedule.

5. The system of claim 4, wherein said timing device includes a light sensor or a motion sensor.

6. The system of claim 1, wherein said drive unit moves the line at variable speeds.

7. The system of claim 1, wherein the direction of movement of the line is reversible.

8. A system for repelling birds or animals from an area, comprising:
    at least two braces positioned at a distance from each other about an area to be protected;
    a cable supported by said braces;
    a bird or animal repelling object slideably engaged with said cable and configured to move with respect thereto; and
    at least one shelter supported by at least one of said braces, said shelter positioned in the path of said bird or animal repelling object such that said bird or animal repelling object is hidden from view when disposed therein.

9. The system of claim 8, further comprising a propulsion device for propelling the bird or animal repelling object along the path.

10. The system of claim 9, wherein said propulsion device is powered by an electric current.

11. The system of claim 10, wherein said cable carries an electric current and transmits said current to said propulsion device, thereby providing power thereto.

12. A method of repelling birds or animals, comprising:
    attaching a bird or animal repelling object to a conveyor line;
    conveying the bird or animal repelling object around a predetermined area;
    providing a cover in operative relationship with said conveyor line, wherein the bird or animal repelling object can be hidden at predetermined or random intervals when conveyed into said cover.

13. The method of claim 12, further including providing a timing device configured to control the timing of the conveying and hiding of the bird or animal repelling object.

14. The method of claim 12, further including reversing the direction of conveyance of the bird or animal repelling object at various intervals.

15. The method of claim 12, further including varying the speed of conveyance of the bird or animal repelling object.

16. The method of claim 12, further comprising providing a propulsion device, attached to said bird or animal repelling object to propel said bird or animal repelling object along the path of said conveyor line.

17. The method of claim 12, further comprising:
    repeatedly disposing the bird or animal repelling object within the cover so as to hide the bird or animal repelling object from the view of the birds or animals to be repelled;

repeatedly conveying the bird or animal repelling object out of the cover and into open view of the birds or animals to be repelled in a surrounding environment; and repeatedly returning the bird or animal repelling object to the cover according to a predetermined or random schedule.

18. A method of repelling birds or animals comprising:
(a) conveying a bird or animal repelling object within a predetermined area along a path defined by a conveyor line suspended in the air, the bird or animal repelling object being suspended from the conveyor line by a suspension line;
(b) conveying the bird or animal repelling object suspended from the conveyor line along a portion of the path wherein the bird or animal repelling object is visible to birds or animals to be repelled;
(c) conveying the bird or animal repelling object into a covering wherein the bird or animal repelling object is hidden from view of the birds or animals to be repelled;
(d) conveying the bird or animal repelling object out of the covering back into the visible portion of the path; and
(e) continuously repeating steps (b) through (d) in at least one of a random or predetermined sequence for a predetermined time interval.

* * * * *